United States Patent [19]

Egerdahl

[11] Patent Number: 4,712,717
[45] Date of Patent: Dec. 15, 1987

[54] COMBINED DROP AND BROADCAST SPREADER FOR GRANULAR MATERIAL

[76] Inventor: Raymond H. Egerdahl, 1208 S. 75th St., West Allis, Wis. 53214

[21] Appl. No.: 844,086

[22] Filed: Mar. 26, 1986

Related U.S. Application Data

[63] Continuation-in-part of Ser. No. 578,376, Feb. 2, 1984, Pat. No. 4,588,113.

[51] Int. Cl.⁴ .............................................. E01C 19/20
[52] U.S. Cl. .................................... 222/252; 222/278; 222/236; 222/610; 222/413; 239/661; 239/663; 239/687
[58] Field of Search ............... 222/278, 279, 236, 238, 222/252, 266, 626, 627, 614, 265, 271, 413, 610; 239/661, 663, 687; 291/32, 33

[56] References Cited

U.S. PATENT DOCUMENTS

| | | | |
|---|---|---|---|
| 1,888,821 | 11/1932 | Fearn | 222/625 |
| 2,442,743 | 6/1948 | Wester | 239/687 X |
| 2,474,065 | 6/1949 | Porter | 239/663 |
| 2,668,060 | 2/1954 | Tygart | 239/663 |
| 2,872,080 | 2/1959 | Thene | 222/610 |
| 3,276,633 | 10/1966 | Rahauser | 222/129.1 |
| 3,510,066 | 5/1970 | Swenson | 239/657 |
| 3,616,968 | 11/1971 | James et al. | 222/413 X |
| 3,620,458 | 11/1971 | Rath | 239/657 |
| 3,782,642 | 1/1974 | Trafford | 239/683 |
| 4,032,049 | 6/1977 | Roberts | 222/238 |
| 4,415,104 | 11/1983 | Boudreault | 222/610 |
| 4,491,275 | 1/1985 | Holsworth | 239/663 |
| 4,588,113 | 5/1986 | Egerdahl | 222/626 |

Primary Examiner—Robert J. Spar
Assistant Examiner—Jay I. Alexander
Attorney, Agent, or Firm—Andrus, Sceales, Starke & Sawall

[57] ABSTRACT

A combined drop and broadcast spreader for granular material is mountable on the implement of a front end loader. The spreader includes a hopper containing a plurality of discharge openings in the bottom. A rotatable impeller in the bottom forces the granular material from the openings during drop spreadings. A rotatable broadcast disc is coupled to the rear wall of the hopper for discharging granular material in an arc-like pattern. The hopper includes a hole with an auger supplying and metering granular material from the hopper to the broadcast disc. An auger-like agitator moves the granular material in the hopper to the hole.

17 Claims, 4 Drawing Figures

COMBINED DROP AND BROADCAST SPREADER FOR GRANULAR MATERIAL

The present application is a continuation-in-part application of U.S. patent application Ser. No. 578,376, filed Feb. 2, 1984 and now U.S. Pat. No. 4,588,113, issued May 13, 1986, which patent is incorporated herein in its entirety, by reference.

The present invention relates to an improved, vehicle mounted spreader for granular material such as salt, said fertilizer, and the like.

In many applications, spreaders are subjected to two, somewhat opposing, demands. In some applications, a very precise spreading of the granular material is required. For example, in salting sidewalks, accurate spreading is required to avoid damage to bordering vegetation. Other applications require large area spreading with only little concern for accuracy. Salting a parking lot is a typical example of such an application.

Applicant's earlier U.S. patent shows a spreader that can fulfill both such requirements. The spreader disclosed in that patent can drop the granular material straight down, thereby to accurately cover the area to be spread and avoid spillover to areas not intended to be covered. Or, the spreader may broadcast the granular material and thus cover a large area as the vehicle proceeds. The change between operation in the drop mode and operation in the broadcast mode, as well as the stopping and starting of the spreading action, can be easily and quickly accomplished. The spreader is capable of handling dry or damp granular material and material containing agglomerated granules. The spreader provides close control of the amount of granular material being spread in both modes of operation.

The spreader of the present invention is suitable for easy attachment to the implement mount of a front end loader vehicle. By mounting the spreader on the front of the vehicle, the spreading action can be more easily viewed by the operator than with more conventional rear mounted or towed spreaders. Mounting the spreader on a front end loader also permits the spreader to be easily loaded, emptied, and cleaned by manipulating the implement. It also permits the height of the spreader to be changed. For example, the spreader may be lowered to improve operator visibility when spot spreading and to lessen blowing of the granular material. Or, the spreader can be raised to, for example, salt stairs. Mounting the spreader on the front of the vehicle enables granular material to be spread in areas that could not be reached by a towed spreader and permits use in special applications, such as salting under parked cars.

The combined drop and broadcast spreader shown in applicant's earlier patent includes a hopper for receiving the granular material. The hopper, which may be of a generally V-shaped trough-like configuration, contains a plurality of openings in the bottom through which the granular material is discharged in the drop mode. A rotatable impeller is positioned in the bottom of the hopper above the discharge openings for forcing granular material from the openings. Granular material is also supplied from the hopper to a broadcast means positioned below the hopper for broadcast spreading. The hopper contains an agitator to maintain the granular material in a fluent condition and to supply same to the broadcast spreader. The agitator, impeller, and broadcast means may be operated by hydraulic motors.

The present invention relates to further improvements in the spreader shown in applicant's earlier patent. Specifically, the present invention relates to a new and different means for supplying and metering granular material from the hopper to the broadcast means. Additionally, the present invention hopper to enhance the operation of the spreader.

The invention will be further understood by reference to the drawing in which.

Figure 1:
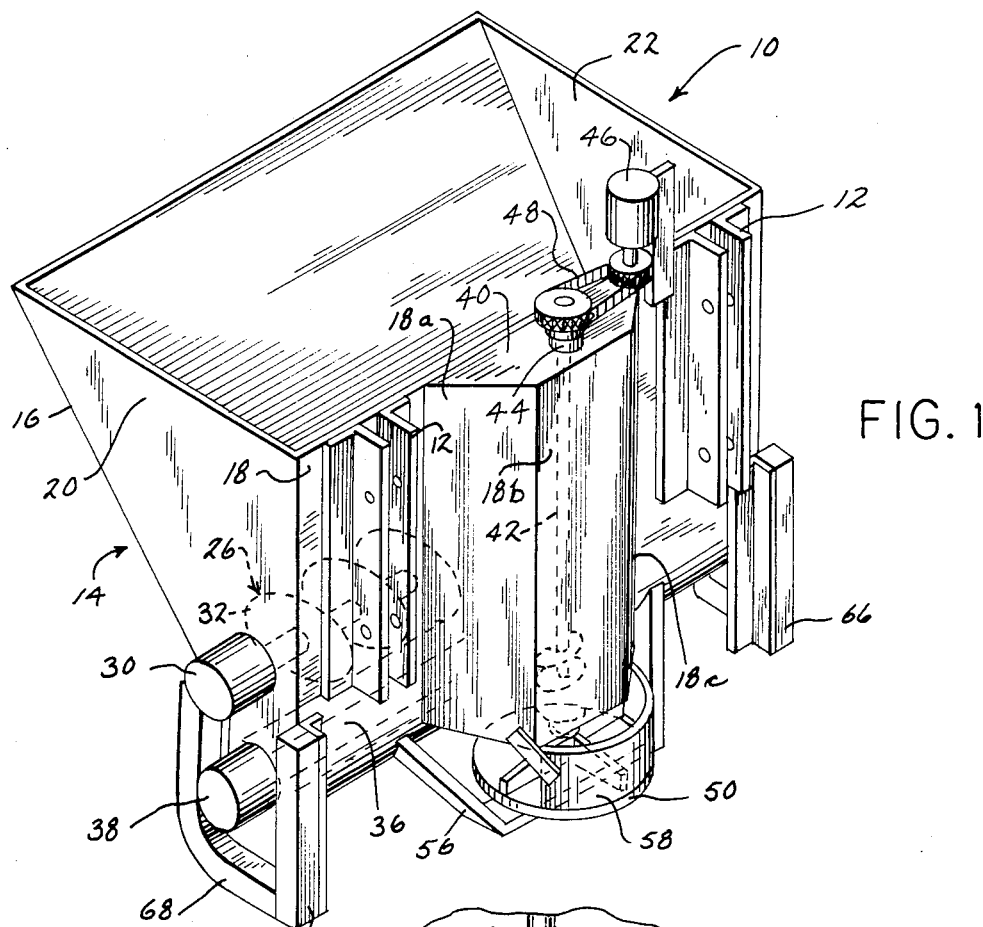
FIG. 1 is a perspective view of the improved spreader of the present invention with portions thereof shown in phantom.

In the figures, the combined drop and broadcast spreader of the present invention is indicated by the numeral 10. Spreader 10 is designed for mounting on the forward portion of a vehicle, such as a conventional front end loader. As such, spreader 10 has suitable attachment means comprising pairs of spaced flanges 12, shown in FIG. 1, to affix the spreader to the movable implement on the front end loader. The implement and attached spreader 10 are vertically movable in height and rotatable about a horizontal axis.

Spreader 10 includes hopper 14 for containing granular material, such as salt, sand, or fertilizer, to be spread. Hopper 14 may have the generally V-shaped trough-like configuration shown in FIG. 1 formed by slanting front wall 16 and generally perpendicular rear wall 18. The attachment means 12 for spreader 10 is fastened to rear wall 18. The ends of hopper 14 are closed by walls 20, 22. The bottom of hopper 14 is curved in a generally U-shape. A plurality of drop spreading openings 23 are spaced in a line along the bottom of the hopper.

A material agitator-auger 26 is mounted in the lower portion of hopper 14. As shown in the Figs., agitator-auger 26 comprises a central shaft 28 journalled in end walls 20, 22 and driven by motor 30, which may be a hydraulic motor. Helical auger flange 32 is mounted on shaft 28. The twist direction of the flange on one half of shaft 28 is opposite to that on the other half of the shaft so that rotation of shaft 28 urges the granular material to the center of hopper 14. To avoid undue accummulation of material in the center of hopper 14, it has been found desirable to provide holes 34 in helical flange 32.

Impeller 36 is mounted in the bottom of hopper 14 below agitator-auger 26. Impeller 36 may include a central shaft journalled in end walls 20, 22 and driven by motor 38, such as a hydraulic motor. A plurality of impeller blades extend along the length of the central shaft at peripherally spaced locations. Impeller 36 forces the granular material from the openings in the bottom of hopper 14.

A means for broadcast spreading is provided in the rear wall 18 of hopper 14. For this purpose, a chamber is formed in rear wall 18. This may be accomplished by walls 18a, 18b, and 18c that form a generally trapezoidal extension or chamber in rear wall 18. The chamber opens into hopper 14 and may be positioned in the central portion of rear wall to receive the granular material provided by agitator-auger 26. The chamber is closed at the top by upper wall 40. Vertical shaft 42 extends through the chamber, such as that formed by walls 18a, b, and c. Vertical shaft 42 may be journalled in upper wall 40 by bearing 44. The upper end of shaft 42 is coupled to motor 46 through chain drive 48. Motor 46 may be hydraulic motor. Broadcast disc 50 is mounted on the lower end of shaft 42. Broadcast disc 50 includes arcuately spaced radial flanges 52. The lower end of shaft 42 may be journalled in bearing 54 supported on hopper 14 by bracket 56. Broadcast disc 50 is partially surrounded by shroud 58 that directs the broadcast material in the direction of forward movement of the vehicle.

Figure 2:
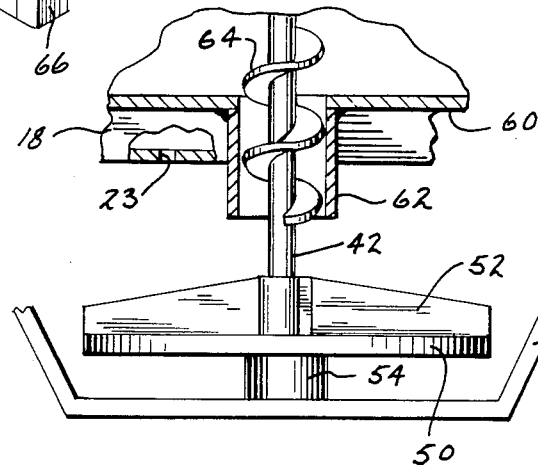
FIG. 2 is a detailed view of a portion of the spreader.
Figure 3:
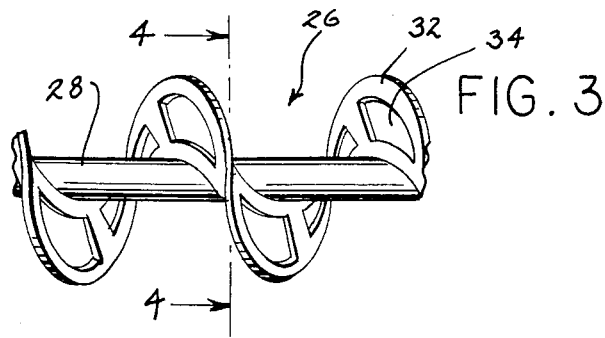
FIG. 3 is a fragmentary view of the agitator-auger of the present invention.
Figure 4:
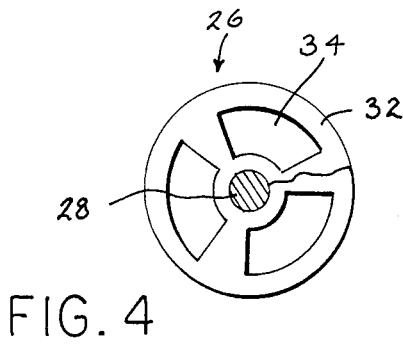
FIG. 4 is a horizontal cross-sectional view of the agitator-auger taken along the line 4—4 of FIG. 3.

The chamber in rear wall 18 is closed at the bottom by lower wall 60, shown in FIG. 2. Wall 60 has downwardly opening sleeve 62 surrounding shaft 42. Helical auger flange 64 is mounted on the portion of shaft 42 within and immediately above sleeve 62 to supply and meter the granular material in hopper 14 through sleeve 62 to broadcast disc 50.

Supports 66 mounted on the ends of hopper 14, for example on the bearing brackets for impeller 36—motor 38, permit spreader 10 to rest on the ground without damage to the broadcast disc assembly. Supports 66 may be curved as to 68 to avoid damage to the pavement when spreader 10 is stored with the upper edge of front wall 16 down or when rotated during loading of hopper 14.

Spreader 10 may be powered by the appropriate hydraulic circuitry resembling that shown in applicant's earlier patent.

In operation, spreader 10, mounted on the front end loader, is rotated in the counterclockwise direction when viewed as in FIG. 1 so that hopper 14 is tipped forward. The spreader is advanced into a pile of granular material, such as salt, to fill hopper 14. Spreader 10 is then rotated clockwise to return it to the operating position. If drop spreading is desired on the area to be spread, the hydraulic circuit is operated to cause motor 38 to rotate impeller 36. The rotation of impeller 36 causes the granular material to drop from the holes in the bottom of hopper 14. The vehicle with spreader 10 proceeds along the area to be spread to deposit the granular material. The speed of impeller 36 and the speed of the vehicle determine the amount of material applied per unit area.

If it is desired to broadcast spread the granular material, the hydraulic circuit is operated to rotate agitator-auger motor 30 and broadcast disc motor 46. The action of agitator-auger 26 causes granular material to move to the chamber in rear wall 18 and onto lower wall 60 of the chamber. The rotation of shaft 42 rotates auger 64 to supply granular material through sleeve 62 onto broadcast disc 50. The rotation of broadcast disc 50 throws the granular material forward in an arc-like pattern to cover a large area as spreader 10 is moved forward. The speed of shaft 42 determines the amount of material supplied to broadcast disc 50. The speed of motor 46 and shaft 42 can be increased or decreased to meter the amount of material supplied to broadcast disc 50. The speed of disc 50 determines the width of the spreading path. The amount of material supplied and the speed of the front end loader determine the amount of material applied per unit area.

Motor 38 for impeller 36 is not energized during broadcast spreading. The static condition of impeller 36 minimizes or eliminates any discharge of granular material from the holes in the bottom of hopper 14.

At the conclusion of the spreading operation, unused granular material can be emptied from hopper 14 by rotating spreader 10 on the front end loader about the horizontal axis of the implement to spill the granular material from the hopper and return it to the storage pile.

Spreader 10 may be easily cleaned by rotating the spreader about a horizontal axis until hopper 12 is upside down. Spreader 10 may then be flushed with water or other cleaning liquid. The movable elements of the spreader may be operated as the flushing proceeds to insure thorough cleaning. Spreader 10 may be stored by resting it on support 66 and the upper edge of front wall 16.

Various modes of carrying out the invention are contemplated as being within the scope of the following claims particularly pointing out and distinctly claiming the subject matter which is regarded as the invention.

I claim:

1. A combined drop and broadcast spreader for granular material comprising:
   a hopper for receiving the granular material, said hopper having a bottom containing a plurality of discharge openings for dropping said material, said hopper having a side wall;
   wall means mounted on said hopper side wall and forming a chamber on said side wall opening into said hopper;
   a rotatable impeller in the bottom of said hopper above said discharge openings for forcing granular material from said openings;
   a rotatable broadcast means coupled to said hopper for broadcasting granular material supplied thereto in an arc-like pattern; and
   means for selectively supplying granular material from said hopper to said broadcast means, said means comprising a hole in said chamber and rotatable supply means operatively associated with said hole for supplying granular material through said hole to said broadcast means.

2. The spreader according to claim 1 including drive means for said rotatable supply means for varying the speed of said rotatable supply means to meter the supply of granular material to said broadcast means.

3. The spreader according to claim 1 wherein said rotatable supply means comprises an auger operatively associated with said hole.

4. The spreader according to claim 3 wherein said hole has a downwardly extending sleeve and wherein said auger is at least partially within said sleeve.

5. A spreader according to claim 1 wherein said broadcast means comprises a rotating disc upon which the granular material is supplied.

6. The spreader according to claim 5 wherein said broadcast means disc has a plurality of generally radial flanges in the surface on which the granular material is supplied.

7. The spreader according to claim 5 including a shroud surrounding at least a portion of said broadcast disc.

8. The spreader according to claim 1 further including an agitation means in said hopper above said impeller for rendering the granular material in the hopper fluent.

9. The spreader means according to claim 8 wherein said agitator is auger-like in form for moving the granular material to said hole in said chamber.

10. The spreader according to claim 9 wherein said auger-like agitator has a helical flange and wherein said flange contains openings for controlling the movement of the material to said hole.

11. The spreader according to claim 1 wherein said hopper has a generally V-shaped troughlike configuration.

12. The spreader according to claim 1 further defined as suitable for mounting on the forward portions of a vehicle.

13. The spreader according to claim 12 further defined as suitable for mounting on a front end loader vehicle.

14. The spreader according to claim 1 including support means extending below said hopper.

15. The spreader according to claim 14 wherein said support means has a portion presenting a rounded surface.

16. The spreader according to claim 1 wherein said rotatable supply means and said broadcast means are mounted on a common shaft extending through said chamber.

17. The spreader according to claim 16 wherein said common shaft is journalled on one of said hopper or chamber.

* * * * *